United States Patent [19]

Reese

[11] Patent Number: 5,288,713
[45] Date of Patent: Feb. 22, 1994

[54] METHOD FOR INJECTING TREATMENT CHEMICALS

[75] Inventor: D. Dwaine Reese, Richmond, Tex.

[73] Assignee: Nalco Chemical Company, Naperville, Ill.

[21] Appl. No.: 394,604

[22] Filed: Aug. 16, 1989

[51] Int. Cl.$^5$ .............................................. C02F 5/08
[52] U.S. Cl. ...................................... 210/696; 208/33; 208/47; 208/48 R; 210/749; 210/757; 210/758; 210/764; 239/10; 585/4
[58] Field of Search ..................... 210/749, 198.1, 199, 210/696, 757, 758, 764; 208/48 R, 33, 47; 585/3, 4, 5; 239/10; 422/7

[56] References Cited

U.S. PATENT DOCUMENTS 2,606,150  8/1952  Thorp .................................. 210/199
4,019,983  4/1977  Mandt ................................. 210/220

OTHER PUBLICATIONS

Bulletin 200-5 200 Series Crane Chem/Meter Hydraulically Actuated Diaphragm Metering Pump.

Primary Examiner—Peter A. Hruskoci
Attorney, Agent, or Firm—Arnold, White & Durkee

[57] ABSTRACT

A method for providing a continuous injection of a substantially constant amount of a desired treatment chemical into a flowing process stream is described. This method insures that the concentration of the desired treatment chemical is maintained at a relatively constant and effective concentration throughout the flowing process stream. The means for providing the relatively continuous injection of the treatment chemical is preferably a pump that provides a continuous injection at a relatively constant flow rate of the treatment chemical into a flowing process stream.

Providing a uniform concentration of a treatment chemical in a flowing process stream maximizes the benefit of the treatment chemical. Conventional methods for injecting treatment chemicals provide intermittent injection of the treatment chemical such that sections of the flowing process stream have no concentration of the treatment chemical. This reduces the benefit of the treatment chemical and may prevent it from providing any benefit at all.

5 Claims, No Drawings

METHOD FOR INJECTING TREATMENT CHEMICALS

BACKGROUND OF THE INVENTION

The invention relates to an improved method for injecting treatment chemicals into a flowing stream such as a process stream in a hydrocarbon processing plant. Specifically, the invention comprises the use of continuous and constant injection of a desired treatment chemical into a flowing process stream to insure the optimum effect of the treatment chemical. Conventional, noncontinuous methods of injecting treatment chemicals into process streams reduce the effect of the treatment chemicals due to the intermittent injection and lack of axial dispersion of the treatment chemical in the flowing process streams. This produces a nonuniform concentration of the treatment chemical in the process stream.

The hydrocarbon processing industry, chemical industry, oil production industry, water treatment plants, and other similar industries and plants frequently use relatively small amounts of treatment chemicals to control undesirable occurrences in process streams and other streams in the plants. The undesirable occurrences may take many forms such as corrosion, saltation, fouling, wax formation, scale formation, and polymerization in pipes or equipment. Corrosion, for example, deteriorates the metal in pipes and process equipment and may cause failure of the pipes or equipment. Fouling and wax formation, for example, occur when particular materials are deposited in pipes and equipment due to undesirable chemical processes, and may lead to plugging of the pipes or equipment.

These problems vary in severity from minor annoyances in the operation of a plant to problems that halt operations of an entire plant. For example, a change from a nonacidic crude oil feedstock in an oil refinery to an acidic crude oil feedstock may cause pipes exposed to the acidic component of the crude oil to experience sudden and severe corrosion. The pipes may develop a hole within hours or days, and cause a processing unit or the whole refinery to shut down. Thus, the effective use of the appropriate treatment chemicals to eliminate these problems may be of paramount importance for the operation of a hydrocarbon processing plant or other plant.

Various treatment chemicals are available to remedy each of these problems in any particular application. Many chemical companies manufacture and sell treatment chemicals to alleviate specific problems for particular types of process streams. For example, Nalco Chemical Number 5192 made by Nalco Chemical Company may be used to prevent corrosion in overhead process streams.

Typically, treatment chemicals are injected intermittently into process streams because the pumps used for this purpose provide an intermittent, nonconstant flow of the treatment chemical. Generally, positive displacement pumps are used to inject treatment chemicals into flowing process streams. Several types of positive displacement are available.

Piston pumps are one type of positive displacement pump used for injecting treatment chemicals. For example, a Milton-Roy pump incorporates one or more pistons which are driven by a motor. The pistons pull liquid into a piston chamber when the piston is moving away from top dead center of its stroke, and discharge liquid when the piston is moving towards top dead center of its stroke.

Another type of a positive displacement pump is a diaphragm pump which incorporates a flexible diaphragm as one wall of a fluid chamber. When the diaphragm is flexed away from the chamber liquid is pulled into the chamber by the suction created by the diaphragm. When the diaphragm is flexed into the chamber liquid is discharged from the chamber due to the pressure from the diaphragm. Generally, positive displacement pumps are used to inject treatment chemicals into process streams because of their dependability and their ability to accurately discharge a measured amount of treatment chemical.

Positive displacement pumps share a common flow pattern that derives from their nature and results in a two stage cycle: Stage 1 is a discharge stroke that produces a positive flow of liquid which varies with time and is typically represented by a positive sine wave. Stage 2 is a return stroke during which there is no liquid being discharged. The duration of the discharge stroke and the duration of the return stroke are the same, and the combined duration for both strokes is the cycle time for the pump. The cycle time for positive displacement pumps ranges from about 0.6 to 1 second. Thus, for a positive displacement pump operating at full capacity, liquid is only being discharged during 50 percent of the cycle time at best.

Typically, the amount of liquid discharged by positive displacement pumps may be varied from 10 percent of the pump's discharge capacity to the pump's full discharge capacity. When a positive displacement pump is adjusted to deliver less than its full capacity the pump only discharges liquid during a portion of the pump discharge stroke. And the sine wave representing the flow of liquid from the pump is reduced in amplitude. The result is a decrease in the total amount of liquid discharged by the pump.

The total amount of time that the positive displacement pump does not discharge liquid is the combined amount of time of the return stroke and the amount of time during the discharge stroke when no liquid is being discharged. Consequently, if the pump is operating at less than full capacity, treatment chemicals will be injected into the flowing process line less than 50 percent of the time.

During the cycle time when no treatment chemical is being discharged by a positive displacement pump the liquid of the process stream is continuing to flow past the injection point. This section of liquid is not being treated. With the pump at full capacity the section of liquid with no injected treatment chemical corresponds to the amount of liquid that flows past the injection point during the return stroke. If the pump is operating at less than full capacity, this section of liquid corresponds to the amount of liquid that flows past the injection point during both the return stroke and the portion o the discharge stroke when no liquid is discharged. At a minimum, 50 percent of the liquid in the process stream line will not be injected with treatment chemical. And if the pump is operating at less than full capacity this percentage will be greater than 50 percent.

When treatment chemical is injected intermittently into a process stream the chemical will mix rapidly in a radial direction from the point of injection. Consequently, the concentration of the treatment chemical is relatively uniform across the cross-section of the flowing process stream within a short distance from the point at which the treatment chemical is injected. This is due to the rapid radial mixing that occurs in the turbulent flow regime of most flowing process streams.

Axial mixing, however, does not appear to occur rapidly in a flowing process stream. It is generally a function of the nature of the flowing liquid, the nature of the injected liquid, and the flow regime of the flowing liquid. The nature of the flowing liquid and the treatment chemical are important to the extent that the liquids will tend to mix. For example, if the liquids have some chemical attraction to each other they will tend to mix. In the case of a polar treatment chemical being injected into a flowing polar liquid, the polar affinity between the treatment chemical and the flowing liquid will cause axial dispersion more quickly than would occur for a nonpolar treatment chemical injected into a flowing nonpolar liquid.

The flow regime of a flowing fluid is dependent on the velocity that the fluid is flowing, the geometry of the flow, and the density and viscosity of the flowing fluid at flow conditions. This relationship is calculated as the Reynold's Number of the flowing fluid. The Reynold's Number is a dimensionless quantity that represents the ratio between the inertial forces in a flowing fluid and the viscous forces in a flowing fluid. It is frequently used to correlate various parameters relating to the behavior of flowing fluids.

The Reynold's Number (Re) is calculated by the following mathematical formula:

$$Re = DVp/\mu$$

where D is the pipe diameter in feet; V is the liquid velocity through the pipe in feet per second; p is the liquid density in pounds per cubic foot; and $\mu$ is the liquid viscosity in pounds per foot per second. Robert H. Perry and Cecil H. Chilton, *Chemical Engineer's Handbook*, McGraw-Hill Book Company, 5th ed., 1973, page 5-4, FIG. 526. For a given flow geometry (e.g. flow in a pipe) empirical data related to the Reynold's number indicates whether the flow regime of a flowing liquid is laminar or turbulent.

Laminar flow occurs at low flow velocities, and is characterized by minimal radial mixing between microscopic elements of the flowing liquid. Further, laminar flow is characterized by different flow velocities for microscopic elements of the flowing liquid depending on the distance between the element of the flowing liquid and the wall of the pipe in which the liquid is flowing. Turbulent flow occurs a high flow velocities, and is characterized by extensive radial mixing and random variations in the flow velocities of microscopic elements of the liquid.

For a liquid flowing in a pipe the flow regime is generally laminar at Reynold's Numbers less than 3000, and turbulent at Reynold's Numbers greater than 3000. Typically, process streams in hydrocarbon processing plants have Reynold's Numbers in excess of 3000 and the liquids are flowing in a turbulent flow regime.

Reported studies have noted the degree to which axial dispersion will occur in flowing liquids in pipes. T. Sherwood, R. Pigford, and C. Wilke, *Mass Transfer*, McGraw-Hill Publishing Company, 1975, 137-141. These studies generally indicate that axial dispersion of a liquid in another flowing liquid correlates with the Reynolds number of the flowing liquid. Mass Transfer, supra at FIG. 4.17. More particularly the effective axial dispersion coefficient, which is a measure of the tendency for a liquid to axially disperse in another flowing liquid, will increase as the Reynold's Number for the flowing liquid increases.

Overall the concentration profile of a liquid injected into a flowing liquid in a turbulent flow regime will follow a Gaussian curve. Mass transfer, supra at 138 and FIG. 4.16. Very little dispersion will occur at a point near the point of injection, and dispersion will gradually increase as the liquid flows farther from the point of injection.

For example, for two batches of oil flowing through a 12-inch pipeline at a velocity of 4 feet per second, the second batch of oil will only disperse 750 feet into the first batch of oil after traveling 24 miles through the pipeline. *Mass Transfer*, supra at p. 140–41.

Referring to EXAMPLE 1 a test flow loop was constructed to study axial dispersion in a liquid flowing through a tube. Using a diaphragm pump, which provided an intermittent injection of red dye, it was observed that minimal dispersion of the red dye occurred 50 feet from the point of injection of the red dye into a flowing water stream. Further, large sections of the flowing water stream had no observable concentration of the red dye at all.

If this effect is scaled up to the size of typical plant streams it is evident that significant portions of a process stream will not contain any concentration of a treatment chemical. For example, consider an overhead line in a crude oil processing unit with a 10 inch diameter which carries a flowing liquid with a velocity of 100 feet per second. A positive displacement pump is used to inject a treatment chemical such as a corrosion inhibitor. The positive displacement pump is operated at 25 or 30 percent of its capacity because these pumps are typically sized to provide maximum extra capacity.

If the pump operates at 1 cycle per second and is adjusted to deliver 25% of its capacity the treatment chemical will only be injected for ⅛ of a second. The time period of no injection will be ⅞ of a second. During the injection period of ⅛ of a second the flowing process stream will move 12.5 feet, and a section 12.5 feet long will contain the treatment chemical. During the period of no injection the flowing process stream will move 87.5 feet and a section 87.5 feet long will contain no treatment chemical. Five seconds later the flowing process stream will have traveled 500 feet. At which time, based on the flow loop test, the treated section will have slightly expanded from 12.5 feet and the untreated section will have slightly decreased from 87.5 feet.

The combined effect of intermittent injection of a treatment chemical into a flowing process stream and the lack of axial dispersion of the treatment chemical in the process stream is that significant portions of the flowing process stream will have no concentration of the treatment chemical. This problem increases as the velocity of the flowing process stream increases relative to the cycle time of the pump used to inject the treatment chemical because the amount of nontreated process stream correspondingly increases. Thus, the effectiveness of the treatment chemical is reduced. In fact, the treatment chemical may not provide any benefit at all in these situations. Consequently, there is a need for a method that provides a continuous and constant injection of a treatment chemical into a flowing process stream.

SUMMARY OF THE INVENTION

The invention comprises a method of continuously injecting a substantially constant amount of a treatment chemical into a flowing stream. This insures that the concentration of the treatment chemical is relatively uniform throughout the flowing process stream and maximizes the benefit of the treatment chemical. The method can be used to inject a broad range of treatment chemicals in wide range of applications.

Conventional methods of injecting treatment chemicals provided intermittent and nonconstant injection of the treatment chemical into the flowing process stream, and resulted in reduced effectiveness of the treatment chemical.

The method of the invention may be used to increase the effectiveness of any treatment chemical that is injected intermittently by providing superior effect of that treatment chemical or reducing the amount of treatment needed to achieve a certain effect. Further, the method of the invention may allow the use of treatment chemicals in particular applications in which they were ineffective using conventional injection methods.

DESCRIPTION OF THE INVENTION

The method of the invention provides a continuous injection of a treatment chemical into a flowing process stream so that there are no portions of the flowing process stream that do not have some concentration of the treatment chemical. The use of continuous injection of treatment chemicals has achieved superior treatment results relative to the use of pulsating or intermittent injection of treatment chemicals, and has achieved positive results in some applications for which the use of intermittent injection achieved no benefits.

The method may be used to inject treatment chemicals into virtually any process stream. Process stream is defined broadly as any stream of flowing fluid. The nature of the flowing process stream may vary greatly and includes many varieties of flowing fluids. It may comprise water at normal conditions such as cooling tower water or may comprise oil such as diesel fuel at elevated temperatures or pressures. Further, the process stream may include liquids or gases or a mixture thereof.

Process streams are typically contained by a pipe or conduit. They may flow from one piece of processing equipment to another or from one part of a processing unit to another part. In most instances the process stream is under pressure, and may also be at elevated or reduced temperatures.

A broad variety of treatment chemicals may be injected by the method of the invention. Some examples include corrosion inhibitors, neutralizing agents, antifouling agents, anti-scaling agents, dewaxing agents, antipolymerization agents, acids, bases, oxygen scavengers, chemical catalysts, dyes, crystal modifiers, biocides, foam control agents, oxidizing agents, reducing agents, bleaches, sizing agents, buffering agents, and mixtures thereof.

The method includes a supply of the desired treatment chemical. Typically, this is a container of the desired treatment chemical. For example, a 55 gallon drum may be used as the supply for the treatment chemical. A larger or smaller container may be used as necessary depending on the rate at which the treatment chemical will be used. When one container is emptied a full container is substituted for it.

The supply of the treatment chemical is connected to a means for injecting the treatment chemical into the process stream. Generally, the connection is accomplished by piping or tubing using conventional methods and equipment. The connection provides a means for the treatment chemical to flow from the supply to the injection means.

The means for injecting the treatment chemical into the process stream must provide a continuous flow of the treatment chemical in a relatively constant amount. Preferably, the means for providing continuous injection of the treatment chemical is a constant flow pump available from Stanmar Manufacturing, a Texas proprietorship doing business at 1630 South Houston, Livingston, Tex. 77351. The Stanmar constant flow pump achieved a continuous and substantially constant injection of the treatment chemical into flowing process streams.

It should be appreciated that devices other than the Stanmar constant flow pump may be used to practice the invention. For example, conventional gear pumps will provide a relatively constant output of a treatment chemical for the purposes of providing a continuous injection of the treatment chemical into a flowing process stream. Further, the pressurization of a reservoir of the treatment chemical may also be used to achieve a relatively constant injection of a desired treatment chemical. A pulsation dampening device may also be used in combination with an intermittent pump such as a positive displacement pump to achieve a relatively constant injection of a treatment chemical.

The injecting means is typically connected to the process stream using piping or tubing. The injecting means may also be directly connected to the process stream. Conventional methods and equipment are used to make this connection. Typically, a backflow prevention device will be incorporated into the connection between the injecting means and the process stream to prevent any flow of the process stream into the treatment system.

Overall the treatment system operates by having treatment chemical flow from the supply to the means for injecting the treatment chemical, and from the means for injecting the treatment chemical to the process stream. Thus, the treatment chemical is injected continuously into the process stream in a relatively constant amount to achieve a relatively uniform concentration of the treatment chemical in the process stream.

EXAMPLE 1

A test loop was constructed to investigate axial dispersion of a liquid which was injected into a flowing liquid using both a conventional diaphragm pump and a constant flow pump. The flow loop was made of 50 feet of clear flexible ⅜ inch (inner diameter) plastic tubing. A constant flow of water with a flow rate of 10 feet per second was passed through the flow loop. A red dye was injected into the flowing water at the start of the flow loop using both a conventional diaphragm pump and a novel continuous pump. The axial dispersion of red dye was visually observed as the water flowed through the flow loop for both the diaphragm pump and the continuous pump.

The diaphragm pump was typical of conventional positive displacement pumps which provide an intermittent nonconstant flow of liquid. The diaphragm pump completed 1 cycles per second. The discharge stroke of the diaphragm pump lasted ⅛ second and the return stroke lasted ⅛ second. Each cycle of the diaphragm pump corresponded to an amount of the water traveling 10 feet in the flow loop. The capacity of the pump was 3 gallons per hour.

At a setting of 50% of the rated capacity of the diaphragm pump, dye was injected for ¼ second which corresponded to an amount of water flowing 2.5 feet through the flow loop. Thus, a section of water 2.5 feet long contained red dye immediately after injection. No dye was injected by the pump for ¾ second which corresponded to an amount of water flowing 7.5 feet through the flow loop. Thus, a section of water 7.5 feet long had no red dye. The water flowing through the flow loop contained alternating sections of treated water and untreated water.

After a treated section of water had traveled 50 feet (5 seconds later) through the flow loop from the point of injection the treated section expanded slightly was not significantly greater than 2.5 feet as observed by the length of the water section that contained red dye. The corresponding water section with no red dye was slightly less than 7.5 feet in length. Further, because the dye and water were polar liquids, the axial dispersion was greater than would otherwise be expected.

Visual observations of the flow loop after red dye was injected by a prototype of the constant flow pump indicated a relatively constant concentration of red dye throughout the treated water as it flowed through the flow loop. Variations within the sections of water that contained red dye were not readily discernible. The constant flow pump had a capacity of about 12 gallons per hour.

EXAMPLE 2

The method of the invention was tested in an ethylene production plant. The test involved three towers used for ethylene fractionation. The three towers all experienced corrosion problems in overhead lines caused by exposure to acetic acid.

A prototype of the Stanmar constant flow pump was connected to the overhead lines in two of the three towers. The pumps were used to inject monoethanolamine, a neutralizing agent, to reduce the acidity of the overhead stream and inhibit corrosion. Approximately 4000 pounds per day of monoethanolamine were injected.

Initially, in the absence of chemical treatment for corrosion, measured iron concentrations in the overhead streams of the towers ranged from 10-15 ppm (parts per million). Further, corrosion probe activity was measured for the overhead streams as 600 mils (1/1000 of an inch) per year. After beginning the continuous chemical treatment the iron concentration in the overhead stream was reduced to less than 0.1 ppm. Likewise, the corrosion probe activity was reduced to 0 mils per year.

On one occasion, the constant flow pump on one tower became intermittent and operated similar to conventional pumps used for injecting treatment chemicals. Subsequently, the iron concentration and corrosion probe measurements began to increase appreciably, although not back to untreated levels.

A conventional intermittent pump was added to the third tower to inject monoethanolamine. Regardless of the amount of treatment chemical added by the conventional pump, the 10-15 ppm iron concentration levels could not be reduced below 1-2 ppm, and were often higher. Corrosion probe measurements could not be reduced below 10-15 mils per year.

EXAMPLE 3

The method of the invention was also tested in a crude oil processing unit in an oil refinery which experienced corrosion problems. Previously, a crude fractionating tower in the unit was treated with a corrosion inhibitor using conventional intermittent pumps. No success was achieved by using the conventional methods for injecting the treatment chemical for a period of more than one year.

An experiment was attempted to treat the unit with the same treatment chemical as was used previously but using the method of the invention to inject the corrosion inhibitor. After a period of time the crude oil processing unit was taken out of service or brought down for "turnaround" in refining terms. The overhead system was examined. Observations and measurements of the inside of the overhead lines and equipment used in the crude oil processing unit indicated that there was no corrosion.

The examples, methods, and devices described above are illustrative of the invention and other variations may be made without departing from the scope of the invention. It is understood that the details described above are to be interpreted as explanatory and not in a limiting sense.

What is claimed is:

1. A method for treating a flowing stream with a desired treatment chemical, the method comprising:
   injecting an amount of the desired treatment chemical in a continuous and constant manner into the flowing stream to achieve a constant axial concentration of the treatment chemical in the flowing stream wherein the treatment chemical is injected into the flowing stream by pumping a continuous and constant flow of the desired treatment chemical into a pipe containing the flowing stream and wherein the flowing stream exhibits a turbulent flow regime.

2. The method of claim 1 in which the desired treatment chemical comprises:
   corrosion inhibitors, neutralizing agents, anti-fouling agents, anti-scaling agents, dewaxing agents, anti-polymerization agents, acids, bases, oxygen scavengers, chemical catalysts, dyes, crystal modifiers, biocides, foam control agents, oxidizing agents, reducing agents, bleaches, sizing agents, buffering agents, or mixtures thereof.

3. A method for treating a hydrocarbon process stream flowing in a pipe with a treatment chemical, the method comprising:
   providing a supply of the treatment chemical; and
   injecting an amount of the treatment chemical into the flowing hydrocarbon process stream by pumping a portion of the supply of the treatment chemical into the pipe containing the flowing hydrocarbon process stream in a continuous and constant manner to achieve a constant axial concentration of the treatment chemical in the flowing hydrocarbon process stream.

4. The method of claim 3 in which the flowing hydrocarbon process stream exhibits a turbulent flow regime.

5. The method of claim 3 in which the treatment chemical comprises:
   corrosion inhibitors, neutralizing agents, anti-fouling agents, anti-scaling agents, dewaxing agents, anti-polymerization agents, acids, bases, oxygen scavengers, chemical catalysts, dyes, crystal modifiers, biocides, foam control agents, oxidizing agents, reducing agents, bleaches, sizing agents, buffering agents, or mixtures thereof.

* * * * *